Sept. 1, 1964 C. W. TINSLEY 3,146,507
HOSE CLAMP
Filed Jan. 3, 1962 2 Sheets-Sheet 1
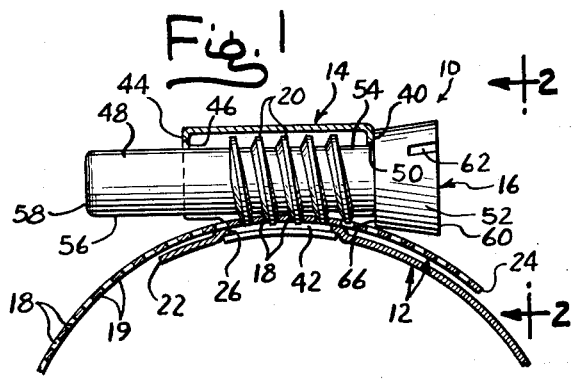
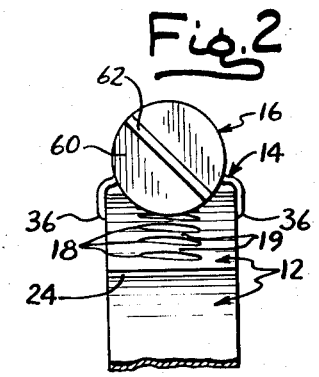
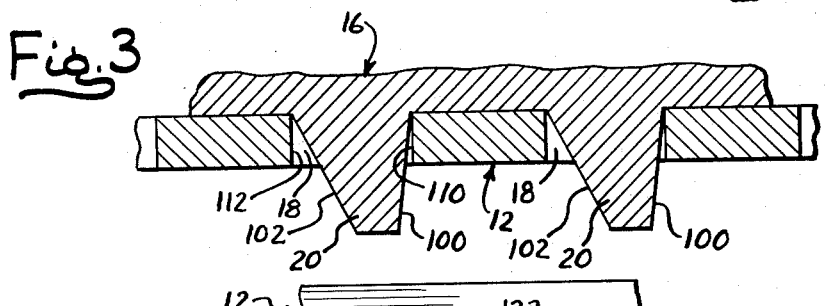
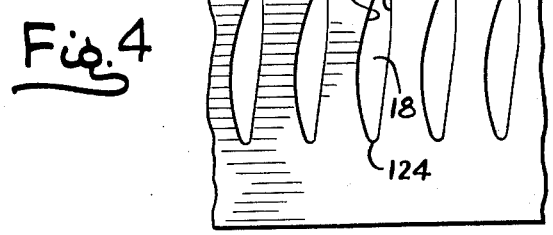
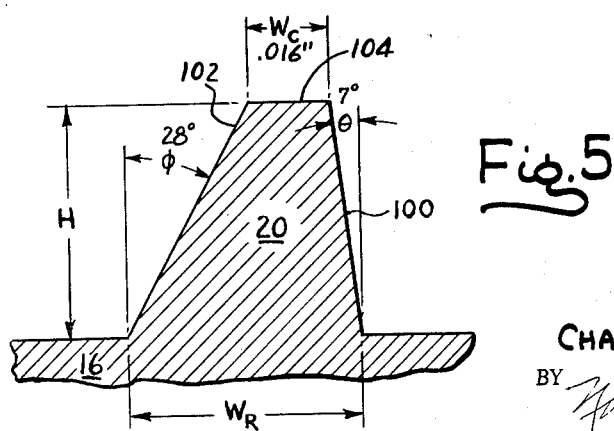
INVENTOR.
CHARLES W. TINSLEY
BY
ATTY.

Sept. 1, 1964   C. W. TINSLEY   3,146,507
HOSE CLAMP

Filed Jan. 3, 1962   2 Sheets-Sheet 2

| DESIGNATION | PROGRESSION OFFSET | TAPER OFFSET | TOTAL OFFSET | THREAD WIDTH | LATERAL DISPLACEMENT |
|---|---|---|---|---|---|
| E | .01111 | .00470 | .01581 | .0211 | .1048 |
| D | .00888 | .00276 | .01164 | .0314 | .0781 |
| C | .00666 | .00145 | .00811 | .0384 | .0556 |
| B | .00444 | .00061 | .00505 | .0428 | .0358 |
| A | .00222 | .00015 | .00237 | .0453 | .0175 |
| C/L | 0 | 0 | 0 | .0461 | 0 |
| A' | -.00222 | .00015 | -.00207 | .0453 | .0175 |
| B' | -.00444 | .00061 | -.00383 | .0428 | .0358 |
| C' | -.00666 | .00145 | -.00521 | .0384 | .0556 |
| D' | -.00888 | .00276 | -.00612 | .0314 | .0781 |
| E' | -.01111 | .00470 | -.00641 | .0211 | .1048 |

INVENTOR.
CHARLES W. TINSLEY
BY
ATTY.

ved to be fully as strong as those having square cut threads.

United States Patent Office 3,146,507
Patented Sept. 1, 1964

3,146,507
HOSE CLAMP
Charles W. Tinsley, Naperville, Ill., assignor to Du Page Manufacturing Company, a corporation of Illinois
Filed Jan. 3, 1962, Ser. No. 164,129
1 Claim. (Cl. 24—274)

The present invention relates generally to hose clamps like those which are commonly employed in the automotive industry for coupling or connecting hose sections to radiators, engine blocks, power steering and power brake apparatus, water pumps, and the like. The invention is more particularly concerned with that type of hose clamp wherein the opposite ends of a flexible clamping band are adapted to be acted upon by a freely rotatable operating worm or screw in such a manner that the band may be constricted about a hose section and centripetal force thereby applied to the hose section in order to retain it in coextensive sealing engagement with a cylindrical pipe or flange and thus establish a fluid-tight connection. While the improved hose clamp of the present invention has been designed primarily for use in connection with such automotive use, the invention may, if desired, be employed in other fields. Irrespective, however, of the particular use to which the present invention may be put, the essential features thereof are at all times preserved.

Although many millions of worm drive hose clamps of the character or type heretofore mentioned have been and are now being manufactured and extensively used in the automtotive industry and although high interest and constant improvement in such clamps is evidenced by the relatively large number of worm drive clamp patents which have been issued since initial market introduction of such clamps, the clamps, as manufactured at the present time, are not altogether foolproof. One phase of a worm drive clamp wherein there is room for improvement resides in the construction or design of the flexible clamping band and it is to this phase of the clamp that the present invention pertains.

Band-tightening operations in a worm drive hose clamp of the type under consideration are effected by reason of the mating engagement between the helical worm thread and a longitudinal series of cooperating threads on one end of the band. For convenience of description herein and to avoid possible confusion, the worm thread will be referred to simply as the worm helix, while the band thread will be referred to as such. Band threads, as currently employed in connection with worm drive hose clamps, are of two general types; and these are the so-called "thru cut" thread, and the so-called "square cut" thread. In the thru cut thread, a series of transversely extending elongated slots are formed at equally spaced regions along one end of the band, the slots extending completely through the metal of the band and the intervening ribbons of metal between adjacent slots affording shoulders or threads proper for cooperation with the worm helix. In the square cut thread, a series of transversely extending elongated grooves are formed in the outer side or surface of the band at equally spaced regions along the band and the side walls of the grooves afford the necessary shoulders or threads proper. Although the square cut thread results in a stronger band than the thru cut thread, the latter thread has found far greater favor on the market due to the fact that the square cut thread requires a thicker and less flexible band and one which is more costly, both from the standpoint of the manufacturing processes to make it and of the higher cost of the band stock. The present invention relates specifically to a worm drive hose clamp wherein the band has a so-called thru cut thread.

Although, admittedly, bands having thru cut threads are weaker than bands having square cut threads, they possess certain advantages in that the region of engagement between the band thread and the worm helix may consistently be maintained at or near the root of the helix where the helix is thickest. With the square cut thread foreign particles which may become lodged within the grooves will be driven to the bottoms of the grooves when the worm helix enters the grooves and thus the worm may be constrained to move out of threaded engagement with the band. With the thru cut thread, the slots are bottomless and the worm helix may project completely through the slots so that the band may assume a tangential relationship with respect to the cylindrical worm body and thus engage the worm helix at the root thereof.

As stated above, although bands having thru cut threads are not as strong as bands having square cut threads, the fact that the worm helix may project completely through the slots will enable a larger number of helix turns to become effective at any given moment during either tightening or loosening of the band. This fact, coupled with the fact that root engagement is made possible, as outlined above, affords a construction which should be adequately strong enough for all ordinary applications but which sometimes fails due to the fact that perfect mating engagement between the worm helix and the thru cut thread is not effected.

The worm drive hose clamps which appeared on the market at an early date gave little consideration to band thread configuration, and it was found that the elongated rectangular transversely extending slots in the band for thread-forming purposes would fail under conditions of high stress or continued stress, such failure of the band being due to the fact that the curved or arcuate surfaces of the worm helix made tangential point contact with the band thread. Another cause of such band failure has been the unduly large slot area involved, this area being appreciably larger than that necessary merely to encompass the thread helix where it projects through the band. Recognizing this latter cause of band failure, the patentee of United States Patent No. 2,452,806, granted on November 2, 1948 and entitled "Clamp," proposed the use of band slots which generally are of "half moon" design or shape, having straight edges at one side, and curved or arcuate edges at their other side. By reason of the arcuate edges, the slots are somewhat closed about the projecting portion of the thread helix. Thus, there is little lost motion possible beaween the projecting portion of the thread helix and the slots, and the over-all area of the slots is appreciably decreased so that more total metal is available in the band for band-strengthening purposes.

In the use of any worm drive hose clamp of the character under consideration herein, attention must be given to band-loosening operations as well as to band-tightening operations. Many a hose clamp band which has functioned satisfactorily during initial application thereof in an installation and has remained in service for a long time has failed when attempts have been made to loosen it. Elastomeric hose sections of the type to which worm drive hose clamps are ordinarily applied will, in time, deteriorate particularly if they become impregnated with hydrocarbon deposits resulting from contact with oil or gasoline, and appreciable force is required between the worm helix (which is capable of two-way action) and the band thereof. Where the bond between the band and the elastomeric material of the hose section has become particularly firm, as much, if not more, pressure will be required to release the band as was required to tighten it initially. In such an instance, the character of the mating engagement between the normally trailing face of the worm helix and the normally leading edge of the band thread becomes important and surfaces which present only a tangential point contact will open up a tear in the band. Once a tear has been initated, the band of the clamp is worthless for future use.

In addition to this limitation of possible tear in the band during band-loosening operations, the same limitation, although to a lesser extent, is present during band-tightening operations. This is because conventional bands, including the particular band of the hose clamp of said Patent No. 2,452,806 cited above, are provided with thread-forming slots having normally trailing edges which are linearly straight and, therefore, make only tangential point contact with the leading face of the worm helix during band-tightening operations. Although in longitudinal cross section, and from a draftman's point of view, the leading face of the worm helix appears as a straight line, in reality this face is curved due to longitudinal thread progression, much as a helical ramp surface is curved when cut through by a horizontal plane.

The present invention relates specifically to the shape or contour of the thread-forming band slots of a worm drive hose clamp of the type under consideration and affords an improvement over existing hose clamps in that it makes provision for intimate edge-to-face line contact between each band slot and the projecting portion of the worm helix, both with respect to the leading and the trailing helix faces. By such an arrangement, not only are the entire leading and trailing edges of the band slots available as reaction edges to assimilate the pressure exerted by the turning or rotation of the worm helix, but closure of the slots upon the projecting portion of the worm helix is more complete than has heretofore been the case, thus strengthening the band by reason of the greater amount of metal which is left intact after the slotting operation has been completed during manufacture or production of the band.

The invention has been illustrated and described herein for illustrative purposes in connection with a hose clamp worm having a so-called buttress thread or helix of specific dimensions, but it will be understood that the invention is applicable to hose clamp worms other than those of the buttress type, or to worms of the buttress type possessing dimensions other than those illustrated and specified herein. According to the invention, for each worm helix configuration or thread section, there will be a corresponding band slot configuration to effect the necessary intimate mating thread engagement.

The provision of a hose clamp possessing the advantageous features of novelty briefly outlined above being among the principal objects of the present invention, numerous other objects and advantages, not at this time enumerated, will become readily apparent as the following description ensues.

In the accompanying two sheets of drawings forming a part of this specification, one illustrative embodiment of the invention has been shown.

In these drawings:

FIG. 1 is a fragmentary sectional view taken substantially centrally and longitudinally through a hose clamp employing the improved band slots of the present invention, and in the vicinity of the tightening worm and housing therefor, the worm being shown in side elevation;

FIG. 2 is a sectional view taken on the line 2—2 of FIG. 1;

FIG. 3 is an enlarged fragmentary sectional view taken substantially centrally and longitudinally through the worm and band in the vicinity of their region of mating engagement;

FIG. 4 is a fragmentary plan view of a limited region of the band showing the shape of the thread-forming band slots;

FIG. 5 is a fragmentary detail sectional view of a typical tightening worm helix giving specific dimensions;

Figures 6, 7:
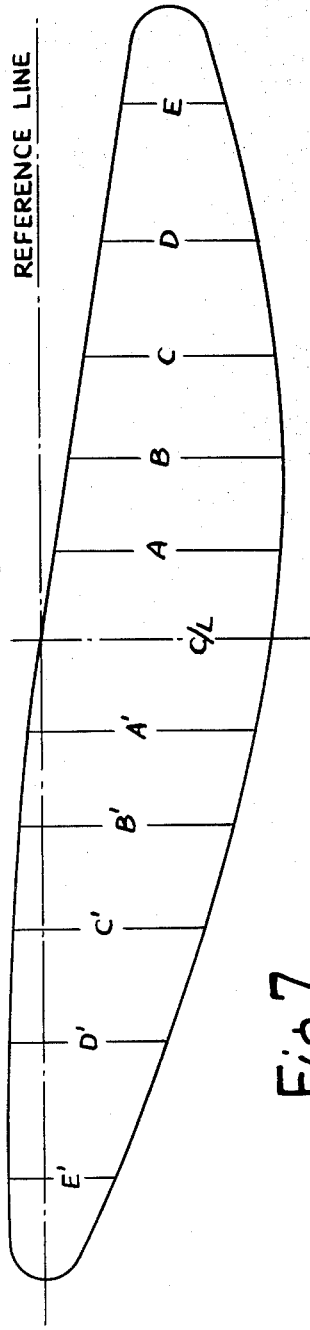
FIG. 6 is a schematic diagram of a plotted graph employed in the mathematical computation of the geometrical slot configuration.
FIG. 7 is a table employed in conjunction with the graph of FIG. 6.

Referring now to the drawings in detail, and in particular to FIGS. 1 and 2, wherein a worm drive hose clamp, embodying a slotted band made in accordance with the principles of the present invention, has been designated in its entirety by the reference numeral 10. In general, the clamp 10 involves in its organization three principal components or parts, namely, a clamping band 12, a box-like housing 14 and a tightening worm 16 for the band 12.

The band 12 of the clamp 10 is in the form of an elongated flexible strip of resilient sheet metal stock, preferably spring steel, of uniform width. The band is formed with a plurality of equally spaced, elongated, narrow slots 18 which define therebetween a series of intervening ribbon-like teeth or thread sections 19 and are cut in the band at such an angle as to cooperate with the helix 20 of the band-tightening worm 16. These spaced slots 18 extend from one end of the band 12 a sufficient distance longitudinally of the band that the latter may be employed in connection with hose sections of varying diameters although it is preferable that the band be of a specific cut length for a predetermined diameter hose section. For purposes of description herein, one end 22 of the band 12 may be regarded as being the fixed end while the other end 24 may be considered to be free and slidable relatively to the fixed end 22.

The fixed end 22 of the band 12 is crimped so as to form a slightly offset seat portion 26. The latter provides a seat which is arcuate in configuration to conform to the curvature of the outside cylindrical surface of a hose section (not shown) to which the band is to be applied. Portions of the housing 14 are spot-welded to this offset seat portion 26 to maintain the housing in fixed position on the band 12.

The housing 14 is of unitary, rigid, box-like construction and is preferably in the form of a sheet metal stamping which, in its finished form, includes a generally semi-cylindrical top wall or crown portion 32. The latter has outwardly offset lower side wall portions 34, the lower edges 36 of which are turned inwardly to provide opposed inwardly extending flanges 38 which are spot-welded to the underneath side of the offset seat portion 26 of the band, as best shown in FIG. 2 of the drawings. It is to be noted at this point that the off-setting of the seat portion is resorted to specifically so that the portions of the band 12 which are adjacent to this offset portion 26 will lie in the same arcuate plane as that of the flanges 38 and thereby afford a more complete or substantially continuous engagement between the band and the hose section to which the band is applied. The housing 14 is rigid and has an end wall 40 which is in the form of a down-turned flange of limited arcuate extent, this flange, in effect, constituting a single thread designed for cooperation with the helix 20 of the worm 16 so that the worm, which normally is maintained coaxial with the elongated, box-like housing, may be unthreaded from the housing for removal purposes. The offset seat portion 26 is formed with a central opening 42 therethrough so that the helix 20 of the worm 16 will not interfere with the fixed end 22 of the band 12 when the worm is turned in either direction to impel the slidable end 24 of the band axially through the housing 14 in one direction or the other. The housing 14 is formed with a second or downwardly extending down-turned end wall 44 at the end of the housing remote from the end wall 40. The end wall 44 is of shorter extent than the end wall 40 and affords a relatively wide entrance opening or mouth 46 through which the shank portion 48 of the worm 16 projects and into which the slidable end 24 of the clamping band 12 may be threaded, so as to speak, during initial assembly of the clamp or during application of the clamp to a hose section. The end wall 40 of the housing affords a restricted opening 50 through which the shank portion 48 of the worm 16 also projects.

The helix 20 of the worm 16 is of limited extent and terminates short of the enlarged head portion 52 of the worm so as to provide, in effect, a clearance region 54 for the housing end wall 40. This helix also terminates remote from the distal end of the worm 16, thus providing a smooth uninterrupted cylindrical stem 56 between the extreme distal end 58 of the worm and the helix. The head portion 52 of the worm has an end face 60 which is slotted as at 62 diametrically across the head to accommodate reception of one end of a tool, such as a screwdriver, by means of which the worm 16 as a whole may be turned in either direction.

It is to be observed that when the slidable end 24 of the clamping band 12 projects through the housing 14 and the helix 20 is in operative register and engagement with the threads afforded by the slots 18, the inner rim of the down-turned housing end wall 40 engages the cylindrical surface of the clearance region 54, while the helix 20 is forced against the walls or edges of the various slots 18 so that the axis of the worm becomes fixed and is coaxial with the axis of the housing 14. Thus there will normally be no lateral or longitudinal shifting of the worm with respect to the housing. The worm is fixed or rigid within the housing except for the rotational movement of which it is capable and except for a limited amount of axial shifting movement in one direction as limited by engagement of the down-turned end wall 40 with the rearwardly facing shoulder 66 afforded by the head portion 52 of the worm 16.

Insofar as the present invention is concerned, the arrangement of parts thus far described is conventional and merely illustrative of one form of worm drive hose clamp to which the principles of the invention may be applied. The specific housing 14 and worm 16 illustrated herein and the manner in which they cooperate generally with the clamping band 12 are similar to the worm, housing and clamping band shown and described in United States Patent No. 3,028,650, granted on April 10, 1962, and entitled "Worm Drive Hose Clamp." No claim is made herein to any novelty in either the housing or the worm, nor is any novelty predicated upon the construction of the clamping band except insofar as the shape of the thread-forming slots 18 therein is concerned.

For a detailed description of the manner of use of the hose clamp and of the specific advantages offered by the specific form of housing and worm thereof, reference may be had to the above-mentioned patent application. For purposes of discussion herein, it is sufficient to state that in installing the clamp on a given hose section, the band is placed about the hose section so that it encircles the latter and the end 24 thereof is fed through the open mouth 46 and between the offset seat portion 26 and the worm 16 so that the worm helix engages the walls or edges of the openings 18. Utilizing a suitable tool such as a screwdriver, the worm 16 may be turned in such a direction as to feed the slidable end region of the band 12 through the housing 14 to contrict the band about the hose section, the slidable end region moving to the right as viewed in FIG. 1. When the band has been thus tightened to the desired extent, the turning operation will be terminated and the worm will effect a self-locking engagement with the threads of the band by reason of the small pitch angle of the helix. Inter-engagement between the shoulder 66 and the end wall or flange 40 will effect the necessary axial reaction force against the worm so that the latter will perform its locking function. Loosening of the clamping band 12 from the hose section may be effected by turning the worm in the other direction. If the hose section, due to long contact in situ with the band 12 has become bonded to the latter, engagement between the housing end wall 40 and the adjacent end of the worm helix 20 will afford the necessary reaction force for positive movement of the band end 24 to the left, as viewed in FIG. 1, to break the bond and loosen the band 12 from the hose section.

The thread which comprises the herein termed worm helix 20 is commonly known as a buttress-type thread, the details of a typical buttress-type thread including specific dimensions in inches have been illustrated in FIG. 5. The thread (hereinbefore and hereinafter termed helix) illustrated herein is merely exemplary of one form of helix which may be employed, and according to the present invention, the elongated slots 18 which are formed in the band 12 have been fashioned so that they will cooperate with the helix in a more efficient manner than has heretofore been attained. Therein lies the principal feature of the present invention.

Referring now specifically to FIG. 5, the design of the helix 20 illustrated in this view is a preferred design and the dimensions shown give satisfactory operation in an average size worm drive hose clamp.

According to the present invention, with this helix 20, or with any other helix configuration, it is proposed that the shape of the various slots 18 in the clamping band 12 be in precise conformity with the mating surfaces of the worm helix 20 at any given instant during band-tightening or band-loosening operations. In other words, the invention contemplates that when the helix is projected through the slots 18 in operative fashion and tightening or loosening operations are instituted, the then leading surfaces on the worm helix 20 shall make coextensive line pressure contact with the opposed slot edges. To accomplish this, it is obvious that the configuration of each slot 18 must be that of a geometrical shape which represents the intersection of a plane which extends parallel to the worm axis and lies at the extremity of a root diameter of the worm helix. Such a slot configuration has been illustrated in FIG. 4 and the outline thereof in greatly enlarged form is shown by the graph of FIG. 6, this latter view being a plotted chart which, in combination with the tabular information portrayed in FIG. 7, illustrates one method of ascertaining the required slot configuration for the specific helix 20 or for any other buttress-type helix. The method illustrated herein is not the only method which may be employed for ascertaining the required slot configuration, but it is a simple and practical method which may be performed by a design engineer, given only the helix specifications and drafting implements. A more obvious method is to "slice off," so to speak, one side of a commercial worm helix along the calculated intersecting plane and then measure in detail the resultant cross-sectional plane. However, due to the small size of such commercial worms, the accuracy of such measurements cannot be relied upon for use by the die maker in fashioning the clamping band dies.

Referring now to FIG. 5 wherein the cross-sectional shape of the worm helix 20 on a radial plane passing outwardly from the worm axis is shown, the leading face 100 of the helix appears as a straight line which deviates from a transverse plane of the worm 16 by an angle of 7°. The trailing face 102 also appears as a straight line and similarly deviates from a transverse plane of the worm by an angle of 28°. The face 100 is effective against the band during band-tightening operations, while the face 102 is effective against the band during band-loosening operations.

Only three of the manufacturer's specifications appear in FIG. 5. These are the width Wc of the crest 104, the flank angle θ, and the back angle φ. The other manufacturer's specifications are the crest diameter Dc which is stated to be 0.341 inch, the root diameter Dr which is stated to be 0.250 inch, and the helix pitch which is stated to be ten turns to the inch. With these values given, the shape of the helix is established since any other desired dimensions or angles may be calculated therefrom. For example, the thread height H will be $$\frac{Dc-Dr}{2}$$

while the root width Wr will be $Wc+H$ ($\tan \theta + \tan \phi$).

It is to be noted that although the faces 100 appear in FIG. 6 as straight lines, in reality, these faces are curved due to two factors, namely, helix progression and helix taper. Therefore, to express mathematically by three-dimensional equations the shape of one of the slots 18 in the band 16 so as to conform the same to the helix intersection with the root plane as mentioned above, would be a difficult matter and one unlikely to assist all but the most learned die maker. A more practical solution to the problem and a much simpler one is a graphical analysis wherein the width of the helix at various points along the plane of intersection is computed and then the position of each width relative to the point of tangency with the root of the helix is determined, set into a graph, and the composite graph utilized for slot-cutting purposes. Accordingly, the angle which is subtended by a line passing through the point of tangency and the point where the crest of the thread passes through the band and the line axis of the helix is divided into small segments, say eight-degree segments. For each of these segments, three values are calculated, these being; first, the lateral displacement along the plane from the point of tangency; second, the width of the thread; and third, the offset along the axis of the helix. The formulae by means of which these values are derived need not be set forth herein, but the table of FIG. 7, in conjunction with the graph of FIG. 6, portrays the various helix widths, offsets, and distances necessary to produce the desired slot outline, bearing in mind that the outline shown in the graph is the specific outline for the particular worm helix 20 shown in FIG. 5. It may be mentioned at this point that, in FIG. 6, the values of offset due to helix progression on the leading side of the center line are added to the values of offset due to taper. On the trailing side of the center line, the values of offset due to helix progression are subtracted from the values of offset due to taper.

Although the graph of FIG. 6 and the chart of FIG. 7 are predicated upon angle subdivisions of eight degrees each, it is obvious that for a finer and more exact outline of the thread contour and of the corresponding slot outline, smaller subdivisions of the angle involved may be resorted to. Where the larger size clamps are concerned, an eight-degree subdivision may be adequate to obtain a reasonably accurate outline of the slot contour, particularly if the intervening regions of the outline between adjacent thread width measurements are filled-in smoothly with a French curve. Where small size hose clamps are involved, four-degree subdivisions have been found adequate for purposes of obtaining the slot outline.

Referring now to FIGS. 3 and 4, each slot 18, the outline of which corresponds to the graph of FIG. 6, presents a leading edge 110, the various increments of which are on realtively long radii of curvature, and a trailing edge 112, the various increments of which are on relatively short radii of curvature. The worm helix 20, when operatively projected through the slots during either band-tightening or band-loosening operations, substantially fill these slots as shown in FIG. 3. Because the band 12 is possessed of definite thickness, the slots 18 are not completely filled with the metal of the helix 20, the helix taper affording clearance regions shown at 114 and 116 in FIG. 6. However, the leading face 100 of the worm helix makes intimate and coextensive line contact as at 118 with the leading edge 110 of the slot, and the trailing face 102 of the helix makes similar intimate and coextensive line contact as at 120 with the trailing edge 112 of the slot. This is true whether band-tightening or band-loosening operations are in progress. However, during band-tightening operations, the pressure is applied along the line 118, and during band-loosening operations, pressure is applied along the line 120.

Stated in somewhat simpler language, each completed slot 18 has a trailing edge which is arcuate and a leading edge which presents diverging portions on opposite sides of its mid-point. These diverging portions lead and trail, respectively, a reference line passing through such mid-point at a right angle to the axis of the band.

It is to be noted that, at the ends of the slots 18, the outline of each slot is rounded as at 122 on an appropriate radius so that additional clearance regions 124 (see FIG. 6) where there is no metal in the slots, are provided. These rounded ends have been included in the graph of FIG. 6, but they do not enter into the calculations of slot outline disclosed herein. The clearance regions 124 prevent binding of the screw either in the free state of the hose clamp or in use.

From the above description, it will be noted that, during band-tightening operations, the leading face 100 of the worm helix 20 will be forced against the curved leading edge 110 of the band slots 18 along an appreciably long line contact instead of along the usual point contact which exists when bands having conventional rectangular slots therein are employed. What is equally, if not more, important is the fact that during band-loosening operations, the normally trailing face of the worm helix 20 (which then becomes a leading face) is forced against the curved trailing edge 102 of the band slots along a similarly appreciably long line of contact to loosen the band, and, if necessary, to force the sliding end thereof away from the elastomeric material of the hose connector in the event that it has become bonded to the latter, as previously described. Because of the fact that the slots 18 are "tailored," so to speak, to fit the contour of the worm helix 20, there is practically no lost motion possible between the band and worm helix in the circumferential direction of the band. The band is thus possessed of appreciably more metal stock than is the case with conventional bands, and this fact, coupled with the line contact feature, results in a stronger band and one which is unlikely to develop cracks or tears.

Various modifications of the foregoing construction within the scope of the appended claim may be made without departing from the spirit of the invention.

Having thus described the invention what I claim as new and desire to secure by Letters Patent is:

In a hose clamp, an elongated clamping band of flexible strong sheet metal for encircling a hose and having at one end a longitudinal series of spaced transversely extending elongated slots presenting opposed leading and trailing edges and extending completely through the band, a housing secured to the other end of the band, a tightening worm rotatable in said housing and having a multi-turn buttress-type helix adapted to engage in and project through certain of said slots when said one end of the band is projected in a planar path through the housing in overlapping relation with the other end of the band, said helix having a leading face positioned in engagement with the leading edges of certain of the slots during band-tightening operations and a trailing face positioned in engagement with the trailing edges of said certain slots during band-loosening operations, the leading and trailing edges of each slot presenting helix-engaging contours which respectively are conformable to and coincide with the intersection of said planar path of band projection and the worm helix, whereby the edges of each helix-engaged slot make intimate coextensive line contact with the leading and trailing faces respectively of the helix throughout the entire length of said edges during band-tightening and band-loosening operations respectively, the triling edge of each slot being arcuate, the leading edge of each slot having portions which diverge in opposite directions from the mid-point thereof so as to lead and trail respectively a reference line through said mid-point and at a right angle to the axis of the band, the leading and trailing edge of each slot being interconnected by arcuate end portions which are of sufficient dimensions that the buttress-type helical threads of an associated worm will not bind when in intimate line contact therewith throughout the entire length of said edges during band-tightening and band-loosening operations.

References Cited in the file of this patent

UNITED STATES PATENTS

| | | |
|---|---|---|
| 2,386,629 | North et al. | Oct. 9, 1945 |
| 2,395,273 | Hill et al. | Feb. 19, 1946 |
| 2,452,806 | Tetzlaff | Nov. 2, 1948 |
| 2,730,782 | Ludwinski | Jan. 17, 1956 |
| 2,820,276 | Clauss et al. | Jan. 21, 1958 |
| 2,910,758 | Arthur | Nov. 3, 1959 |
| 2,944,314 | Black | July 12, 1960 |

FOREIGN PATENTS

| | | |
|---|---|---|
| 607,597 | Great Britain | Sept. 2, 1948 |